Patented Mar. 30, 1937

2,075,018

UNITED STATES PATENT OFFICE 2,075,018

TERTIARY ALKYLARYLOXY ALKYLOLS

Herman A. Bruson, Elkins Park, and Otto Stein, Lansdowne, Pa., assignors to Röhm & Haas Company, Philadelphia, Pa.

No Drawing. Application November 30, 1934, Serial No. 755,358

11 Claims. (Cl. 260—150)

This invention relates to new ether alcohols having the general formula A—R—O—R$^1$, wherein R represents an aromatic ring, A represents a tertiary alkyl group containing at least eight carbon atoms as a nuclear substituent of R; and R$^1$ represents a monohydroxy or dihydroxy-alkylene radical, which may contain one or more sulfo groups.

These new ethers in the unsulfated form are high boiling, colorless oils which, in contrast to the known lower homologous phenoxyalkylols, are odorless, insoluble in water, and readily soluble in aliphatic hydrocarbons such as lubricating oils. On account of their oily and penetrant qualities, their unctuous nature, and their freedom from odor or rancidity, these new ethers are useful as textile lubricants, or as lubricants for fine mechanisms such as watches. They are furthermore useful in the manufacture of wetting, emulsifying or detergent materials as for example, by the sulfonation or sulfation respectively of group R or R$^1$. They may also be employed as plasticizers for synthetic resins, and for coating compositions comprising oleoresinous varnishes, cellulose esters or cellulose ethers. When used in the form of their sulfonated derivatives or in the unsulfonated condition they may be added to insecticides, cosmetics, soaps, tanning materials, or dyestuffs in order to obtain better dispersions thereof, or for improving their properties.

The raw materials required for the preparation of these new ether alcohols are tertiary alkylphenols containing at least eight carbon atoms in the tertiary alkyl group, as obtained by condensation of tertiary olefines; for example, diisobutylene, dibutenes, triisobutylene, tetraisobutylene, diisoamylene and the like, with phenols, cresols, xylenols, naphthols, guaiacol, and similar phenols or their nuclear halogenated derivatives, as described in copending patent applications, Serial Nos. 600,826, filed March 23, 1932, by W. F. Hester (now Patent No. 2,008,017), 697,928, filed November 14, 1933 by H. A. Bruson (now Patent No. 1,987,228), and also as described in Journal of American Chemical Society, 55, 2571 (1933).

These tertiary alkylphenols condense readily in the presence of small quantities of alkali metal hydroxides or carbonates, with alkylene oxides such as ethylene oxide, propylene oxide, or isobutylene oxide to yield the corresponding alkylphenoxyalkylols. In place of the alkylene oxides, the alkylene halohydrines such as ethylene chlorhydrine, propylene chlorhydrine, glycerol chlorhydrine, isobutylene chlorhydrine, and the like, can be used, in which case the phenols are used preferably in the form of their alkali metal phenates. In both cases it is preferable to conduct the condensation in an anhydrous inert solvent such as alcohol, toluol, butanol, or acetone, at moderate temperatures (50–125° C.). The presence of the tertiary alkyl group having eight or more carbon atoms in the aromatic ring ortho, meta or para to the ether group contributes to these new ether alcohols the property of low viscosity, high penetration, and unusual stability towards oxidation.

Example 1

α, α, γ, γ-tetramethylbutylphenoxyethanol

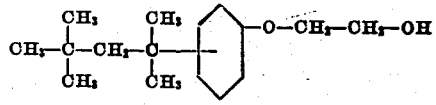

(a) A mixture of 50 grams of α, α, γ, γ-tetramethylbutylphenol (m. p. 84° C.), 1 gram powdered sodium hydroxide and 100 grams dry ethyl alcohol was refluxed for 15 minutes so as to dissolve the alkali. To the cooled solution thus obtained, a solution of 40 grams ethylene oxide in 100 grams ethyl alcohol was added and the mixture allowed to stand 18–24 hours at 10–15° C. under an efficient reflux condenser. The mixture was then heated on a water bath for 3 hours at 50–55° C. and finally for 3 hours at 80–82° C. The alcohol was then distilled off and the residual oil fractionated under reduced pressure. The product distilled at 152–164° C. at 1–2 m. m. as a colorless odorless oil, insoluble in water, but readily soluble in most organic solvents. The yield was 91% of theory. (b) A mixture of 103 grams of α, α, γ, γ-tetramethylbutylphenol, 75 grams n-butanol, 75 grams toluene and 22 grams sodium hydroxide was boiled under reflux. The water which formed was continuously removed while the butanol-toluene mixture was automatically restored to the reaction vessel. After 2–3 hours of boiling, 9 grams of water were collected, showing that the formation of the dry sodium ter-octylphenate was complete. To the clear pale brown solution obtained, 44 grams powdered sodium hydroxide was added, the mixture cooled to about 5° C. and 120 grams ethylene chlorhydrine added all at once. The mixture was stirred vigorously for 5–6 hours at 5–15° C. gradually increasing the temperature to 20–25° C. and allowing the mixture to react thereat for 6–8 hours. Finally the mixture was warmed to about 90° C. during 12 hours. The sodium chloride which separated was filtered off and the filtrate distilled, fl..t at ordinary pressure to recover the solvents and finally in vacuo. The product came over at 170–175° C./3–4 mm. in a yield amounting to 113 grams.

*Sulfation of the above ether (b)*

40 grams of the above ether alcohol was dissolved in 280 grams ethylene dichloride. The solution was cooled to 0–5° C. and 30 grams of 100% sulfuric acid added dropwise thereto during 20 minutes while maintaining the temperature below 10° C. The mixture was then stirred for 2 hours at this temperature, then placed in a separatory funnel and allowed to reach room temperature. Two layers formed, the lower of which was sulfuric acid which was run off. The clear upper ethylene dichloride layer was now cooled to 0° C. and neutralized to litmus with a solution of 8.5 grams sodium hydroxide in 92 cc. of water, while maintaining the temperature at 5–8° C. The neutral mixture thus obtained was then evaporated under reduced pressure to recover the solvent and to dehydrate the mass. The product obtained weighed 58 grams. It formed a cream-colored somewhat waxy soap-like mass having the probable formula:

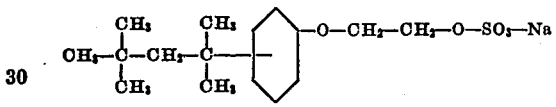

It was soluble in water to give a foamy solution of extremely low surface tension, and having powerful wetting-out properties. The potassium and ammonium salts are similar in their properties to the above sodium salt.

*Example 2*

The phenol used was ter-iso-duodecylphenol, a condensation product of tri-isobutylene and phenol having the empirical formula

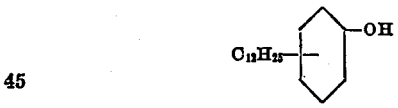

This material was prepared by condensing commercial trisobutylene with phenol in the presence of concentrated sulfuric acid. It formed a viscous, partly waxy oil possessing a boiling range of 132–145° C./3–4 mm. A mixture of one mol. of this triisobutylenephenol, 2 grams powdered caustic soda and 1.8 mols ethylene oxide was condensed in alcohol solution as described in Example 1. The tertiary-iso-duo-decylphenoxyethanol.

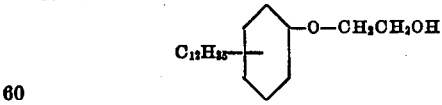

formed a colorless oil, boiling range 140–185° C./4 mm. Upon sulfation with concentrated surfuric acid as described in Example 1, it gave a water-soluble sulfuric acid ester which when neutralized with caustic soda in the cold, gave a foamy, soapy solution from which on evaporation, a brittle resin was obtained having good wetting-out properties.

*Example 3*

The phenol used was ter-isohexadecylphenol, the condensation product of tetra-isobutylene (boiling range 224–259° C.) and phenol prepared by means of concentrated sulfuric acid as a cotalyst. It formed a colorless waxy mass boiling at 130–165° C./2 mm. 1 mol. equivalent of this material was condensed with ethylene chlorhydrine and caustic soda as described in Example 1. The product, tertiary-isohexadecylphenoxyethanol

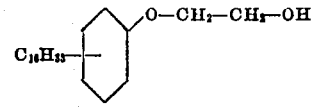

formed a colorless oil, boiling range 140–172° C./3 mm. Upon sulfation it gave a soap-like product having good wetting-out properties.

*Example 4*

The phenol used was ter-isooctylphenol of boiling range 137–142 C./2 mm. as prepared by the condensation of phenol and the dibutene fraction of b. p. 106–116° C. (obtained by the copolymerization of the three isomeric butenes by means of concentrated sulfuric acid).

The above ter-iso-octyl phenol was condensed with ethylene oxide in the presence of potassium hydroxide as described in Example 1. The product, ter-isooctylphenoxyethanol, was a colorless oil b. p. 145–150° C./2 mm.

*Example 5*

A mixture of 103 grams α, α γ, γ-tetramethylbutylphenol, 22 grams sodium hydroxide, 250 ccm. alcohol and 115 grams glycerol monochlorhydrine was stirred for 24 hours at 20–30° C., then heated 6 hours at 70–80° C. The sodium chloride was filtered off, the filtrate washed with water and the oil layer distilled to recover the solvents. The residual oil has the probable formula:

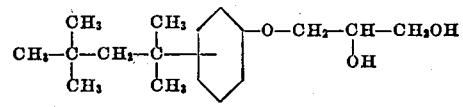

It formed a colorless viscous oil boiling at 215–220° C./7 mm. When esterified with 1 mol. or 2 mol. equivalents concentrated sulfuric acid at 0–5° C. and the product neutralized with ammonia, an excellent wetting agent is obtained.

*Example 6*

To a stirred mixture of 96 grams α, α, γ, γ-tetramethylbutyl-monochlorphenol (b. p. 128–134° C./2 mm.), 200 grams alcohol, and 27 grams sodium hydroxide, there was added dropwise, a solution of 48 grams ethylene chlorhydrine in 50 grams alcohol during 3 hours. The mixture was allowed to stand 18 hours at 25° C. and then heated with stirring on a water bath up to 70° C. during 6 hours. The sodium chloride was then filtered off and the filtrate fractionated. The product, α, α, γ, γ-tetramethylbutyl-chlorphenoxyethanol came over at 194° C./6 mm. as a viscous pale oil.

*Example 7*

To a solution of 50 grams α, α, γ, γ-tetramethylbutylphenol in 100 grams alcohol containing 1 gram sodium hydroxide there was added with cooling to 0° C. a solution of 16 gr. propylene oxide in 50 grams alcohol. The mixture was allowed to stand 24 hours at 20° C., then heated under reflux 8 hours at 75–80° C. Upon fractionating the product, α, α, γ, γ-tetramethylbutylphenoxypropanol was obtained as a colorless oil boiling at 143–145° C./2 mm. Yield 88% of theory.

*Example 8*

Using 23 grams isobutylene oxide in place of the propylene oxide as shown in Example 7, there was obtained 59 grams of α, α, γ, γ-tetramethylbutylphenoxy tertiary butanol boiling a 145° C./1-2 mm.

As in the above examples, the tertiary alkyl group is advantageously derived from an olefine polymer of isobutylene, i. e., a dipolymer, tri-polymer, or tetrapolymer; since these bodies are the most readily accessible tertiary olefines containing respectively 8, 12, and 16 carbon atoms which are capable of forming the corresponding long chain tertiary alkyl phenols on condensation with phenols. However, the polymers of isoamylene, hexylene, heptene, octene and the like, having tertiary unsaturated carbon atoms are likewise suitable for the purposes herein.

It is understood that the above examples are given merely by way of illustration and not limitation. It is apparent to one versed in the art that wide deviations are possible in starting materials, temperatures, conditions of operation, pressure, etc., without departing from the spirit of the invention, the scope of which is limited only by the following claims. The sulfates of the alcohols herein claimed are the subject matter of a divisional application Serial No. 97,347 filed filed August 22, 1936.

We claim:

1. The process of preparing new ether alcohols which comprises reacting upon a phenol having a nuclear tertiary alkyl group of at least eight carbon atoms, in the presence of an alkali, with a member of the group consisting of alkylene oxides and alkylene chlorhydrines.

2. A process of preparing new ether alcohols which comprises reacting upon a phenol having a nuclear tertiary alkyl group of at least eight carbon atoms, in the presence of an alkali metal hydroxide, with a member of the group consisting of alkylene oxides and alkylene chlorhydrines.

3. A process of preparing new ether alcohols which comprises condensing ethylene chlorhydrine with an alkali metal salt of a tertiary alkyl phenol having at least eight carbon atoms in the tertiary alkyl group.

4. A process of preparing new ether alcohols which comprises condensing ethylene oxide in the presence of an alkali metal hydroxide with a tertiary alkylphenol having at least 8 carbon atoms in the tertiary alkyl group.

5. A process which comprises heating an alkali metal salt of alpha, alpha, gamma, gamma-tetramethylbutyl phenol with ethylene chlorhydrine.

6. A process which comprises heating ethylene oxide with alpha, alpha, gamma, gamma-tetramethylbutylphenol in the presence of a small quantity of caustic alkali.

7. An ether alcohol of the formula

wherein R represents an aromatic ring, A represents a tertiary alkyl group containing at least 8 carbon atoms and is a nuclear substituent of R, and $R^1$ represents a member of the group consisting of monohydroxy alkyl and dihydroxy alkyl radicals.

8. A compound of the formula

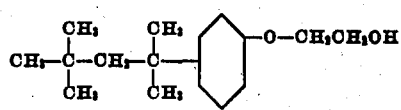

said compound being an oil boiling at about 152–164° C./2 mm.

9. A compound of the formula

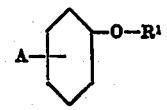

wherein A represents a tertiary alkyl group containing from 8 to 16 carbon atoms inclusive, and $R^1$ represents a member of the group consisting of monohydroxy alkyl and dihydroxy alkyl radicals.

10. A compound of the formula

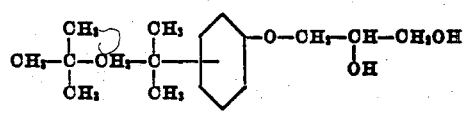

said compound being an oil boiling at about 215–220° C./7 mm.

11. As a new compound α, α, γ, γ-tetramethyl phenoxy propanol.

HERMAN A. BRUSON.
OTTO STEIN.